US009086919B2

(12) United States Patent
Iyer et al.

(10) Patent No.: US 9,086,919 B2
(45) Date of Patent: Jul. 21, 2015

(54) FABRIC INDEPENDENT PCIE CLUSTER MANAGER

(75) Inventors: Shyamkumar Iyer, Nashua, NH (US); Matthew L. Domsch, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 392 days.

(21) Appl. No.: 13/593,234

(22) Filed: Aug. 23, 2012

(65) Prior Publication Data

US 2014/0059265 A1  Feb. 27, 2014

(51) Int. Cl.
| | | |
|---|---|---|
| *G06F 9/46* | (2006.01) | |
| *G06F 13/14* | (2006.01) | |
| *G06F 9/50* | (2006.01) | |
| *G06F 12/00* | (2006.01) | |
| *G06F 15/00* | (2006.01) | |
| *G06F 13/20* | (2006.01) | |

(52) U.S. Cl.
CPC .............. *G06F 9/5011* (2013.01); *G06F 9/46* (2013.01); *G06F 12/00* (2013.01); *G06F 13/20* (2013.01); *G06F 15/00* (2013.01)

(58) Field of Classification Search
CPC ............ G06F 12/00; G06F 15/00; G06F 9/46
See application file for complete search history.

(56) References Cited

U.S. PATENT DOCUMENTS

| | | | |
|---|---|---|---|
| 6,353,898 B1 * | 3/2002 | Wipfel et al. ................... 714/48 |
| 7,222,343 B2 * | 5/2007 | Heyrman et al. ............. 718/100 |
| 7,337,446 B2 * | 2/2008 | Sankaranarayan et al. ... 719/318 |
| 7,395,367 B2 | 7/2008 | Boyd et al. |
| 7,783,822 B2 | 8/2010 | Purcell et al. |
| 7,836,238 B2 | 11/2010 | Freimuth et al. |
| 7,929,565 B2 | 4/2011 | Winter |
| 7,934,035 B2 * | 4/2011 | Miloushev et al. ........... 710/244 |
| 8,031,703 B2 | 10/2011 | Gottumukkula et al. |
| 8,189,603 B2 | 5/2012 | Thomas |
| 8,417,814 B1 * | 4/2013 | Hartmann ..................... 709/225 |
| 2002/0040396 A1 * | 4/2002 | Yoshihara et al. ............ 709/225 |
| 2002/0152305 A1 * | 10/2002 | Jackson et al. ................ 709/224 |
| 2004/0194098 A1 * | 9/2004 | Chung et al. .................. 718/100 |
| 2006/0206655 A1 | 9/2006 | Chappell et al. |
| 2008/0126834 A1 | 5/2008 | Sankaran et al. |
| 2008/0147959 A1 | 6/2008 | Freimuth et al. |
| 2009/0216920 A1 | 8/2009 | Lauterbach et al. |
| 2009/0276773 A1 | 11/2009 | Brown et al. |
| 2009/0327455 A1 * | 12/2009 | Tang ............................. 709/220 |
| 2010/0040053 A1 | 2/2010 | Gottumukkula et al. |
| 2010/0162271 A1 | 6/2010 | Arimilli et al. |
| 2010/0165874 A1 | 7/2010 | Brown et al. |

(Continued)

OTHER PUBLICATIONS

"A Case for PCI Express as a High-Performance Cluster Interconnect," Vijay Meduri, PLX Technology, Jan. 2011.

*Primary Examiner* — Khanh Dang
(74) *Attorney, Agent, or Firm* — Larson Newman, LLP

(57) ABSTRACT

A cluster manager of a computer cluster determines an allocation of resources from the endpoints for running applications on the nodes of the computer cluster and configures the computer cluster to provide resources for the applications in accordance with the allocation. The cluster may include a Peripheral Component Interconnect express (PCIe) fabric. The cluster manager may configure PCIe multi-root input/output (I/O) virtualization topologies of the computer cluster. The allocations may satisfy Quality of Service requirements, including priority class and maximum latency requirements. The allocations may involve splitting I/O traffic.

20 Claims, 8 Drawing Sheets

(56) References Cited

U.S. PATENT DOCUMENTS

| | | |
|---|---|---|
| 2011/0138082 A1 | 6/2011 | Khatri et al. |
| 2011/0289343 A1 | 11/2011 | Schaefer et al. |
| 2011/0317590 A1 | 12/2011 | Gottumukkula et al. |
| 2012/0005392 A1 | 1/2012 | Yagi |
| 2012/0005539 A1 | 1/2012 | Paul et al. |

* cited by examiner

US 9,086,919 B2

FABRIC INDEPENDENT PCIE CLUSTER MANAGER

FIELD OF THE DISCLOSURE

The present disclosure generally relates to information handling systems, and more particularly relates to a PCIe cluster manager.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement clusters of computers connected by a Peripheral Component Interconnect express (PCIe) bus.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
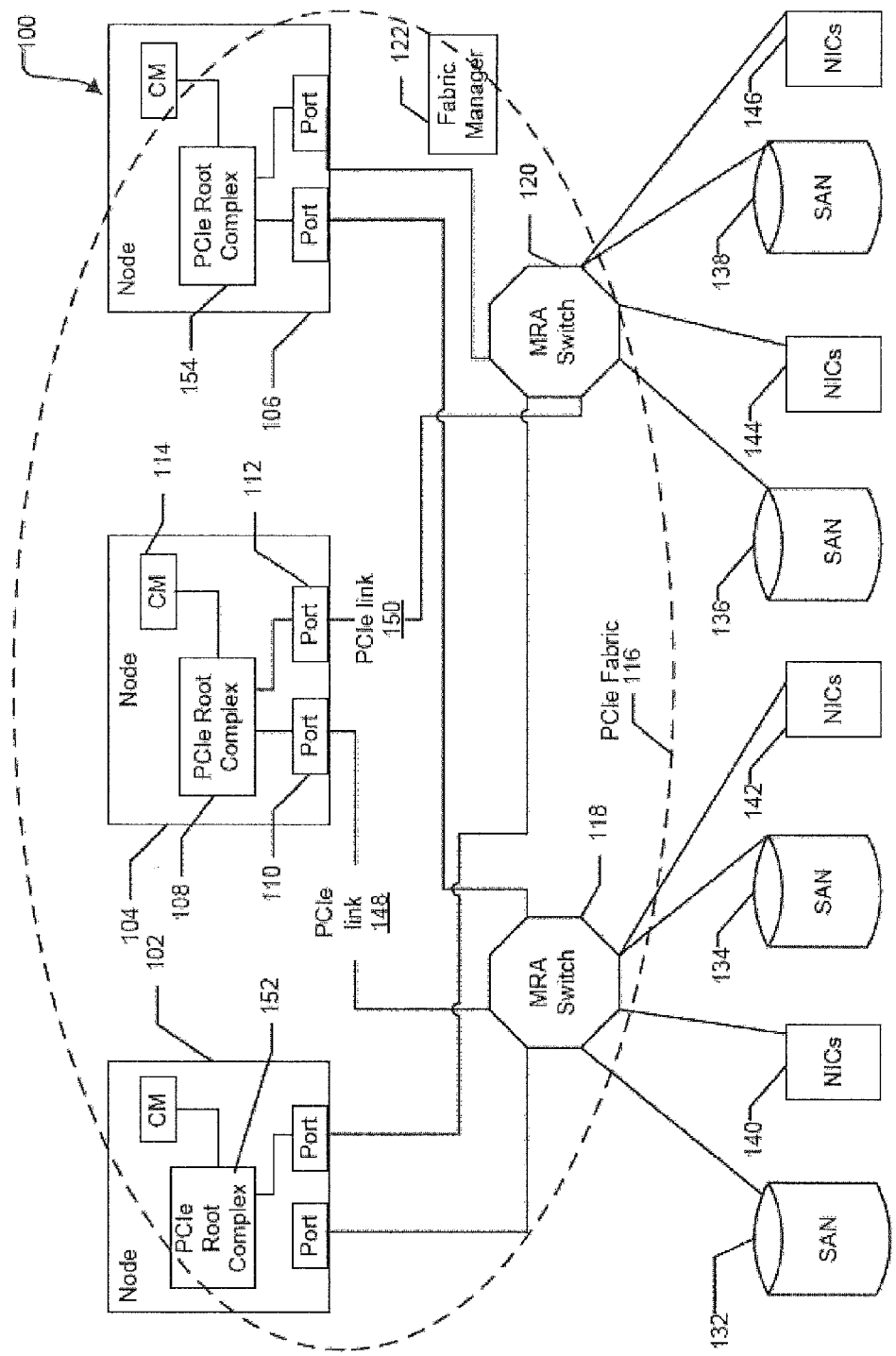
FIG. 1 is a block diagram of a Peripheral Component Interconnect express (PCIe) cluster according to an embodiment of the present disclosure.

FIG. 1 illustrates a Peripheral Component Interconnect express (PCIe) cluster 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, PCIe cluster 100 includes nodes 102, 104, and 106, PCIe fabric 116, storage area networks (SANs) 132, 134, 136, and 138, and network interface cards (NICs) 140, 142, 144, and 146. Nodes 102, 104, and 106 represent a variety of computing resources of PCIe cluster 100 including client information handling systems, data processing servers, or other resources as needed or desired. Node 104 includes a PCIe root complex 108, PCIe ports 110 and 112, and cluster manager 114. Nodes 102 and 106 contain similar components, including PCIe root complexes 152 and 154.

PCIe root complex 108 controls PCIe communications on node 104. PCIe is an implementation of the PCI computer bus based on a serial physical-layer communications protocol. The physical layer consists of single uni-directional links that are connected to exactly two devices. PCIe root complex 108 is the root of a PCIe I/O hierarchy that connects central processing units (CPUs) or memory to PCIe devices. PCIe root complex 108 includes ports 110 and 112. Each port may support a separate PCIe I/O hierarchy. The I/O hierarchies may be comprised of switches such as Multi-Root Aware (MRA) switches 118 and 120, and endpoints such as SANs 132, 134, 136, and 138 and NICs 140, 142, 144, and 146. Endpoints may be devices connected to PCIe cluster 100 to provide functionality, such as storage or connection to the Internet that lie at an end of PCIe cluster 100 opposite the nodes. Ports 110 and 112 are connected to MRA switches 118 and 120 through PCIe links. In a particular embodiment, a PCIe link includes one or more PCIe data communication lanes, where each lane includes a serial transmit lane and a serial receive lane. For example, PCIe links 148 and 150 can be a by-1 (×1) PCIe link with a single lane, a by-2 (×2) PCIe link with two lanes, or similarly configured by-4 (×4), by-8 (×8), or by-16 (×16) PCIe links. In a particular embodiment, PCIe links 148 and 150 include the same number of lanes. For example, each of PCIe links 148 and 150 can be ×4 PCIe links. In another embodiment, PCIe links 148 and 150 include different numbers of lanes, as needed or desired. For example, PCIe link 148 can be an ×16 PCIe link, and PCIe link 150 can be an ×8 PCIe link.

The cluster managers, such as cluster manager 114, may discover the components of PCIe cluster 100, configure the components, and assign resources to the nodes, such as nodes 102, 104, and 106. In the embodiment of FIG. 1, cluster managers are located on each of the nodes 102, 104, and 106. In some further embodiments, one of the cluster managers may be active at any one time. The nodes may select the master cluster manager by a distributed cluster manager algorithm. The master cluster manager may receive a specification of desired resources for an application, called a profile or policy for the application. The policy may be provided by a system administrator or by a node on PCIe cluster 100 that is running the application. The policy may include bandwidth requirements for storage and external network connectivity and quality of service (QoS) requirements. The QoS requirements may specify priority classes and minimum latencies and may also include bandwidth requirements.

Cluster manager 114 may determine resources available from the endpoints of the computer cluster. In case the endpoints are PCIe devices, it may determine their characteristics when they are plugged into PCIe fabric 116. Cluster manager 114 may also determine allocations of resources from the endpoints for the applications. It may then cause each underlying interconnect to implement its portion of the profile. An interconnect may consist of a communications link between a server and an endpoint. Standard types of interconnects include InfiniBand, Fibre Channel, Ethernet, and PCIe. These types may refer to the communications protocol used in the communications link. In many cases, PCIe links may be used to carry traffic utilizing the other protocols.

PCIe fabric 116 includes MRA switches 118 and 120, fabric manager 122, PCIe links 148 and 150, and other PCIe links, not labeled, connecting MRA switches to other components of PCIe cluster 100, such as ports 110 and 112, SANs 132, 134, 136, and 138 and NICs 140, 142, 144, and 146. In the embodiment of FIG. 1, PCIe fabric 116 include nodes 102, 104, and 106. PCIe fabric 116 may be a multi-root IO virtualization (MR-IOV) fabric, enabling endpoints, such as SANs 132, 134, 136, and 138 and NICs 140, 142, 144, and 146 to be shared among logical partitions in multiple systems such as nodes 102, 104, and 106. Similarly, MRA switches 118 and 120 may enable endpoints to be shared among multiple root complexes.

Fabric manager 122 may discover and configure MR-IOV enabled root complexes, switches, bridges, and endpoints, discover and configure non-IOV components, and control and manage errors within the fabric. The configuration may include an assignment of resources to nodes 102, 104, and 106 for applications running on the nodes. In some embodiments, fabric manager 122 may also configure and manage aspects of the system software of the nodes of the cluster complex, such as nodes 102, 104, and 106. In the embodiment of FIG. 1, fabric manager 122 is a stand-alone component. In other embodiments, a fabric manager may be a component of one of the nodes connected by the fabric, such as node 102, 104 or 106.

SANs 132, 134, 136, and 138 provide storage for nodes 102, 104, and 106. A SAN is a dedicated network that provides access to consolidated, block level data storage. To the operating systems of nodes 102, 104, and 106, the storage provided by SANs 132, 134, 136, and 138 may appear as locally-attached devices. The storage devices used in SANs 132, 134, 136, and 138 may include one or more disk drives, arrays of disk drives, other storage devices, or a combination thereof. For example, the storage devices can include virtual drives and partitions that are allocated to nodes 102, 104, and 106. In some embodiments, resources from the physical endpoints can be allocated to virtual endpoints or virtual functions. The nodes 102, 104, and 106 may then access these virtual resources without knowledge of the actual characteristics of the physical endpoints.

Storage commands from nodes 102, 104, and 106 may be relayed over PCIe fabric 116 to MRA switches 118 and 120, and from the switches to the storage devices of SANs 132, 134, 136, and 138. NICs 140, 142, 144, and 146 represent network adapters that are operable to provide a data interface to transmit and receive data between nodes 102, 104, and 106 and devices external to PCIe fabric 116. NICs 140, 142, 144, and 146 can provide one or more instances of a network interface for each of nodes 102, 104, and 106. Each of NICs 140, 142, 144, and 146 may be uniquely identified on computer cluster 100 via one or more unique identifiers. For example NICs 140, 142, 144, and 146 can each be identified by one or more of a media access control (MAC) address, an Internet protocol (IP) address, a worldwide name (WWN), or another unique identifier as needed or desired.

In other embodiments, the fabric connecting the nodes may utilize an interconnect other than PCIe, such as InfiniBand or Ethernet. In further embodiments, a cluster manager may issue configuration commands to end devices in accordance with the PCIe protocol. The commands may be tunneled over the other interconnect and send to the controllers for the end devices for implementation. Other embodiments may feature network structures other than the structure of PCIe cluster 100. Many embodiments may feature other levels of hierarchy. For example, there may be three or more layers of switches between a node and an end device.

Figure 2:
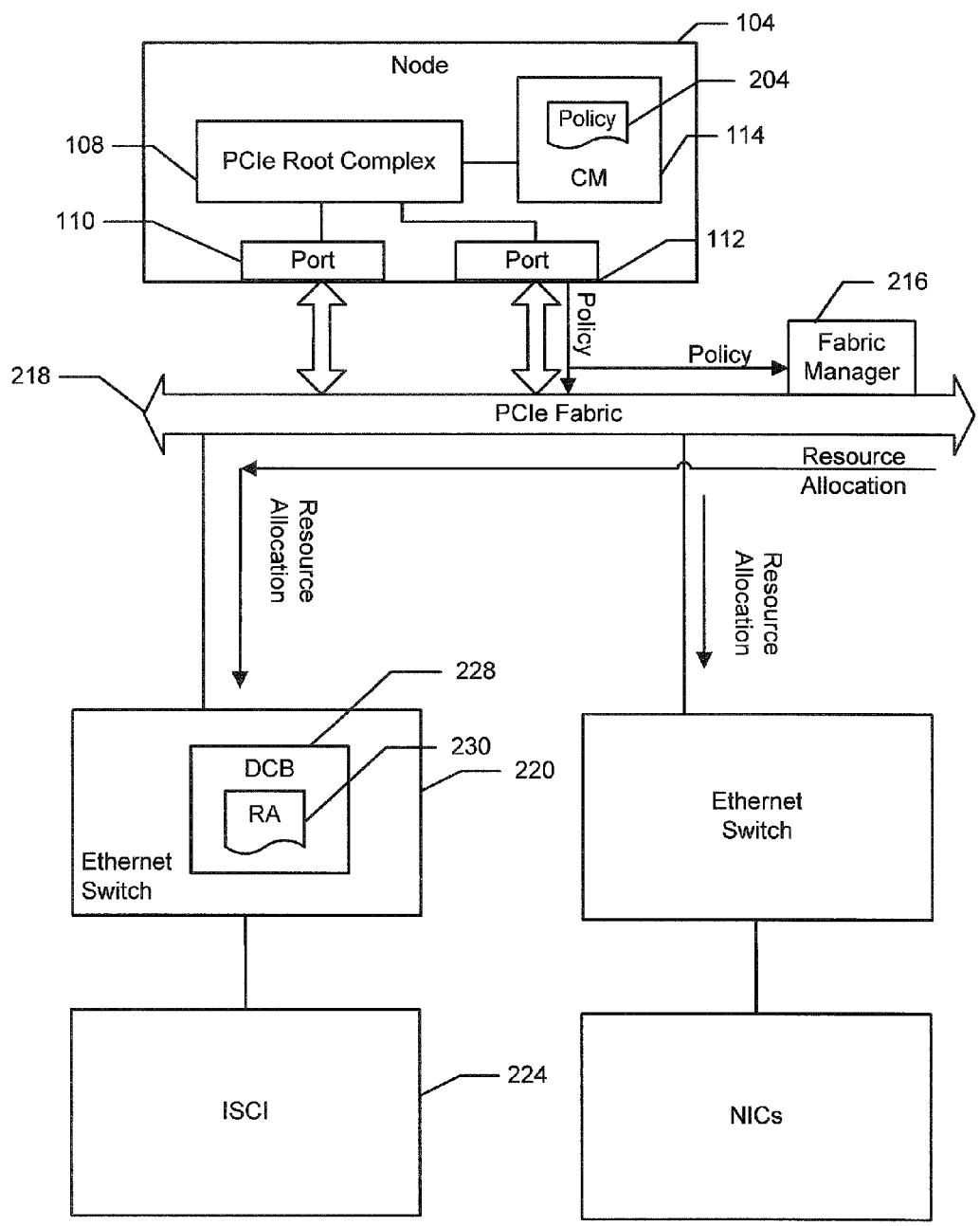
FIG. 2 is a block diagram of a PCIe cluster according to another embodiment of the present disclosure.

FIG. 2 shows a PCIe cluster 200 that includes node 104, PCIe fabric manager 216, PCIe fabric 218, Ethernet switches 220 and 222, Internet Small Computer System Interface (iSCSI) 224, and NICs 226. PCIe cluster 200 may represent a portion of a PCIe cluster such as PCIe cluster 100. Node 104 includes cluster manager PCIe root complex 108, ports 110 and 112, and cluster manager 114. In the diagram of FIG. 2, cluster manager 114 contains policy 204. Policy 204 represents a specification of a resource allocation for an application to run on node 104. Policy 204 may describe allocations of capacities of physical devices, priorities, and latencies. The allocations may include resources for cluster management, for inter-process communications, for storage, and for external Internet communications. Cluster manager 114 may contain a single policy for unpartitioned nodes. Otherwise, if versions of the application run on separate partitions, cluster manager 114 may contain a separate policy for each version of an application running on each partition. A network administrator may determine a policy, such as policy 204, for a node or for a partition of a node, and may transmit the policy to a cluster manager, such as cluster manager 114.

Table 1 illustrates an example of a policy for an application. In this example, the policy provides that the application will receive one allotment of a 20 gigabyte (G) bandwidth Fibre Channel connection, one allocation of a 2 G bandwidth Ethernet connection, and two allotments of 10 G bandwidth InfiniBand connections. Other specifications of policies may provide other aspects of an allocation, such as a maximum latency or a priority. A policy, for example, may provide for a maximum latency of 10 ms and a priority of 4.

TABLE 1

Policy for an Application

| Number | Bandwidth | Resource |
|---|---|---|
| 1 | 20 G | FC |
| 1 | 2 G | Eth |
| 2 | 10 G | IB |

Cluster manager 114 may determine an allocation of resources from the end devices of cluster 200 to implement the requirement of policy 204. It may then transmit the details of the allocation of resources through PCIe fabric 218 to Ethernet Switches 220 and 222. Cluster manager 114 can configure PCIe MR-IOV topologies, as well as underlying Ethernet, Fibre Channel, or other interconnects between systems and I/O components in the cluster. As part of the configuration, cluster manager 114 may direct the flow of traffic through the cluster from the endpoints to the nodes and back. Cluster manager 114 may carve out PCIe bandwidth for cluster service traffic. Cluster manager 114 may also configure PCIe MR-IOV topologies, as well as underlying Ethernet, Fibre Channel, or other interconnects between systems and I/O components in the cluster. Cluster manager 114 may carve out PCIe bandwidth for cluster service traffic. Cluster manager 114 may, for example, include a modified PCIe class driver that carves out PCIe bandwidth for the PCIe cluster manager's interconnect traffic or for cluster interprocess communications (IPC). The modified driver may eliminate the need to modify individual component drivers.

PCIe fabric 218 may include PCIe links and switches to connect nodes, such as node 104, to end devices, such as Internet Small Computer System Interface (iSCSI) 224 and NICs 226. PCIe fabric manager 216 may perform the functions of PCIe fabric manager 122 of FIG. 1. In the embodiment of FIG. 2, PCIe fabric manager 216 may forward resource allocations generated by cluster manager 114 through PCIe fabric 218 to the resource managers. Ethernet switches 220 and 222 may connect PCIe fabric 218 to ISCI 224 and NICs 226 over Ethernet connections. Ethernet switches 220 and 222 may receive resource allocations from cluster manager 114 through PCIe fabric 218 and configure end devices, such as ISCI 224 and NICs 226, in accordance with the resource allocations. Ethernet switch 220 contains Data Center Bridging (DCB) manager 228. DCB manager 228 may implement DCB standards for Ethernet connections that eliminate packet loss due to queue overflow and provide for the allocation of bandwidth over links. DCB 228 may receive resource allocation 230 and may configure ISCI 224 in accordance with it. The DCB protocol provides for assigning various classes to various types of traffic DCB manager 228 may identify traffic tagged with specific priorities and map them to priority groups under the DCB protocol.

ISCI 224 provides storage under the iSCSI protocol, in which SCSI commands are sent between two hosts using IP networks. DCB 228 may configure ISCI to provide an allocation of storage resources to node 202 based upon policy 204. Similarly, Ethernet switch 222 may configure NICs to allocate communications resources to node 202 based upon policy 204. In some embodiments, the system of FIG. 2 may enable automated, dynamic allocation of resources for applications. Instead of an administrator manually configuring a network, including cables between devices and configurations of end devices about resources, the administrator can transmit a policy to the cluster manager. The cluster manager can determine the individual resources needed and manage the configuration details. In some embodiments, the cluster manager may also implement QoS policy. For example, the DCB standards provide for assigning traffic eight classes of priorities. In these embodiments, cluster manager 114 may determine a DCB priority class for ISCI traffic for node 104 and transmit the priority to DCB 228. DCB 228 may then assign that priority class for ISCI traffic for node 104.

Figure 3:
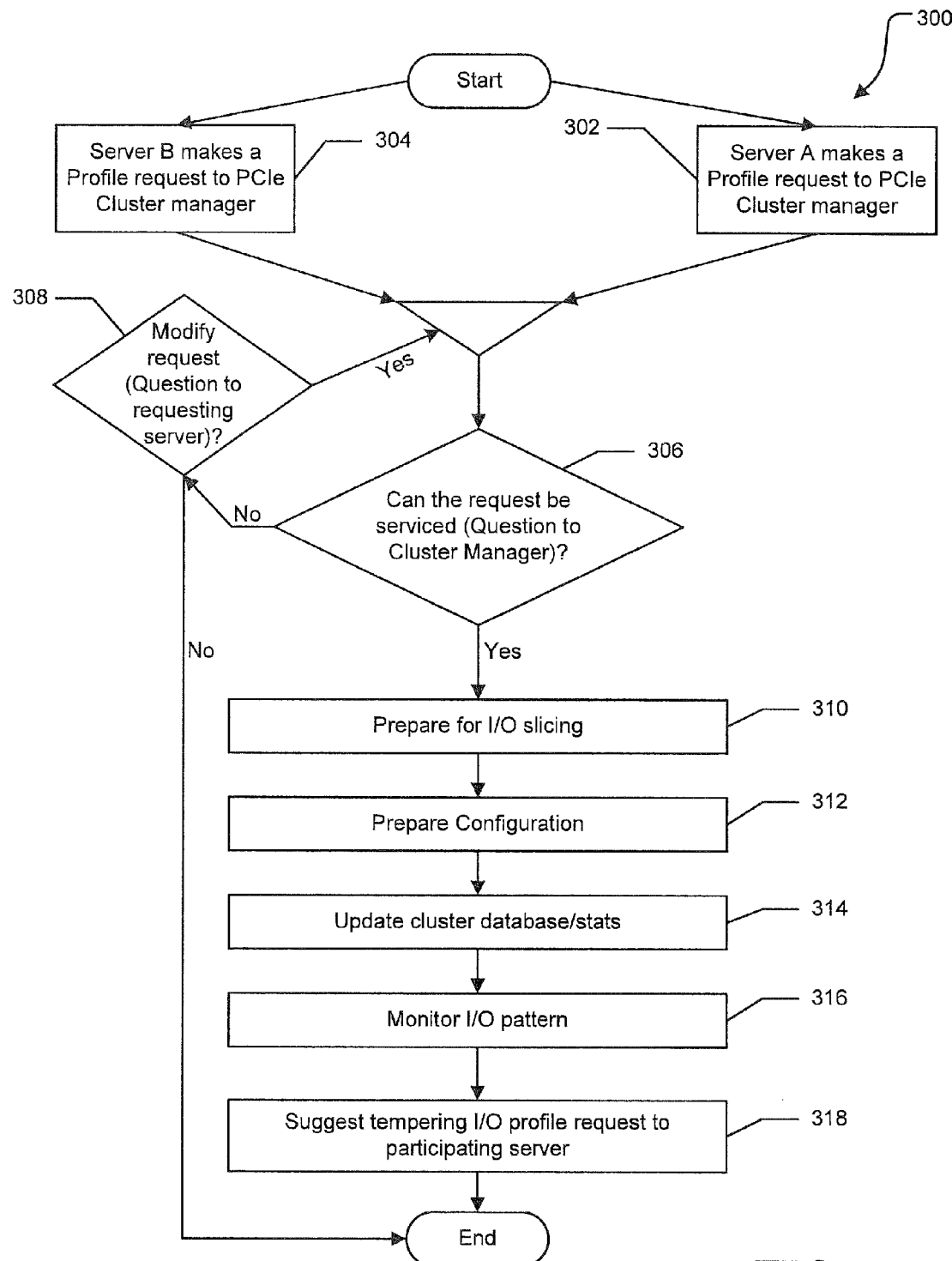
FIG. 3 is a flow diagram illustrating a method of cluster management according to an embodiment of the present disclosure.

FIG. 3 illustrates a method 300 of allocating resources in a computer cluster. Method 300 begins with server A or an administrator in charge of server A making a profile request to the PCIe cluster manager, starting at block 302. The profile request is a request for resources for server A, and may include storage and communications bandwidth requirements. The profile request may also specify maximum latencies and priority settings for resources to which priorities apply. At block 304, an administrator makes a profile request to the PCIe cluster manager concerning Server B.

At block 306, the cluster manager determines if each request can be serviced. A request can be serviced if the end devices of the cluster may furnish the requested resources in addition to furnishing resources for other applications running on the computer cluster. If the cluster manager determines that the request cannot be furnished, the requesting server is asked to modify the request, at block 308. If the request is modified, flow returns to block 306. If the request is not modified, processing of the request is terminated.

If, at block 306, the cluster manager determines that the request can be serviced, the cluster manager prepares for I/O slicing, at block 310. I/O slicing refers to a division of the resources of an end device among multiple nodes or multiple partitions of nodes. As an example, half the capacity of a NIC may be allocated to one node, and half the capacity may be allocated to another node.

At block 312, the cluster manager prepares to configure the resources of the cluster. The cluster manager transmits resource allocations to the device managers, and the device managers in turn configure the devices to fulfill the resource allocation requests. At block 314, the cluster manager updates cluster statistics. The statistics may describe the allocation of the resources of the network to the applications running on the cluster based upon the policies for the applications. The statistics may also describe the current state for the allocations. The statistics may be maintained in a database.

The cluster manager monitors the I/O patterns at block 316. The cluster manager may, for example, monitor bandwidth utilization, I/O statistics, and peak bursts. The cluster manager may also check whether one application is using far less resources than requested, or whether another application is using resources at the limit of the request. At block 318, the cluster manager may suggest tempering the I/O request to a participating service. In the first case, the cluster manager may suggest that the server reduce the resources in the profile request. In the second case, if resources are available, the cluster manager may suggest that the server increase the resources in the profile request.

Figure 4:
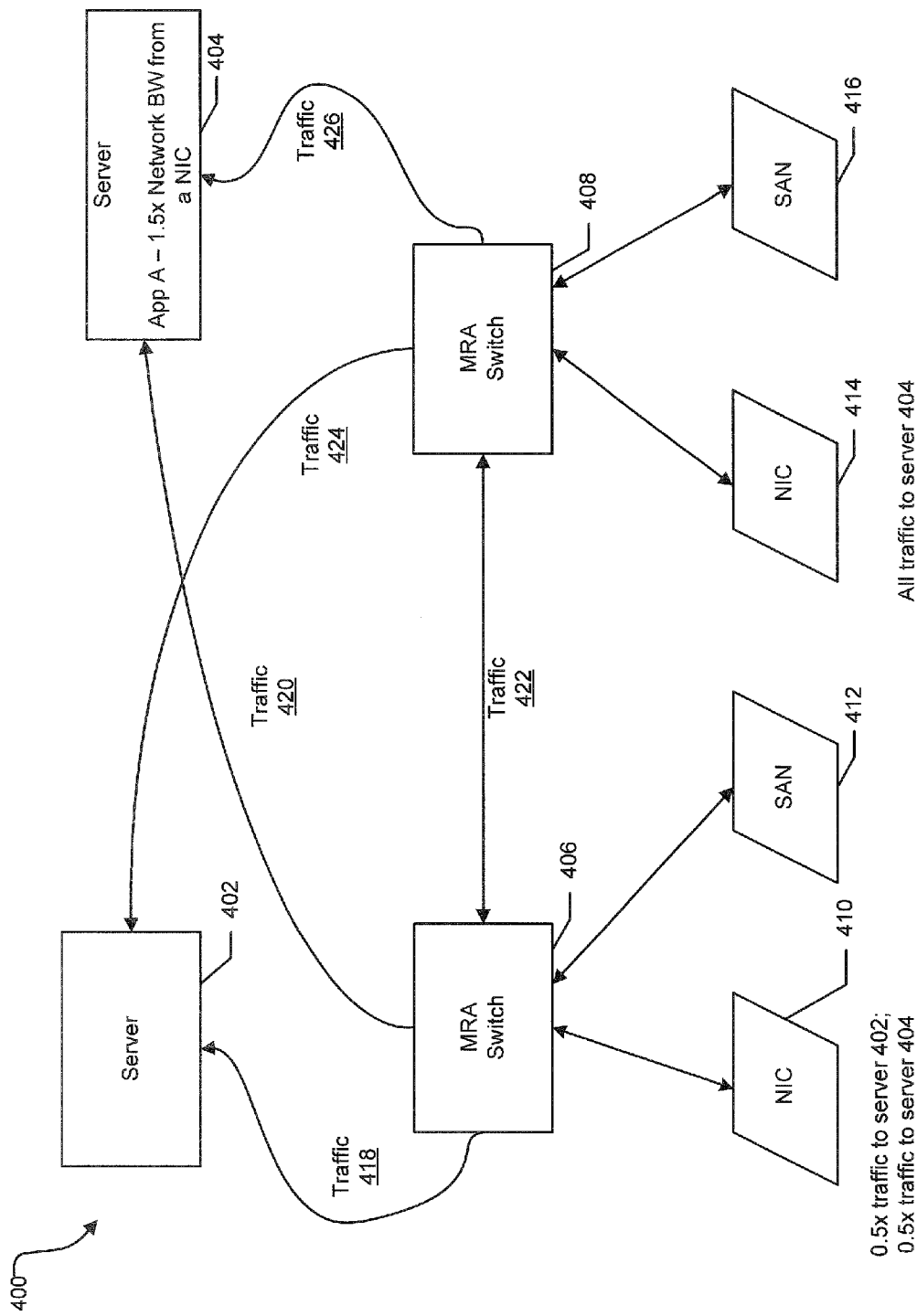
FIG. 4 is a block diagram illustrating PCIe cluster interconnect traffic according to an embodiment of the present disclosure.

FIG. 4 shows PCIe cluster service interconnect traffic 400. FIG. 4 includes a portion of a PCIe cluster that includes servers 402 and 404, MRA switches 406 and 408, NICs 410 and 414, SANs 412 and 416, and links 418, 420, 422, 424, and 426. Links 418, 420, 422, 424, and 426 may carry PCIe cluster service interconnect traffic between components of FIG. 4, such as between MRA switch 406 and MRA 408, and between one of the switches and one of the servers. In the example of FIG. 4, server 402 requires half the capacity of NIC 410 to run an application, and server 404 requires half the capacity of NIC 410 and the total capacity of NIC 414 to run an application. Traffic may flow from NIC 410 to MRA switch 406. Half of that traffic may flow over link 418 to server 402, and half may flow over link 420 to server 404. Similarly, traffic may flow from NIC 414 to MRA switch 408, and from there over link 426 to server 404. In that manner, server 402 receives half the traffic going through NIC 410, and server 404 receives half the traffic going through NIC 410 and all of the traffic going through NIC 414. Thus, in the example of FIG. 4, the use of the PCIe cluster service interconnect traffic has enabled the desired allocation of NIC resources to servers 402 and 404. In particular, this allocation of resources may have avoided the need to add another NIC to the system to fulfill the requirements of server 404.

Figure 5:
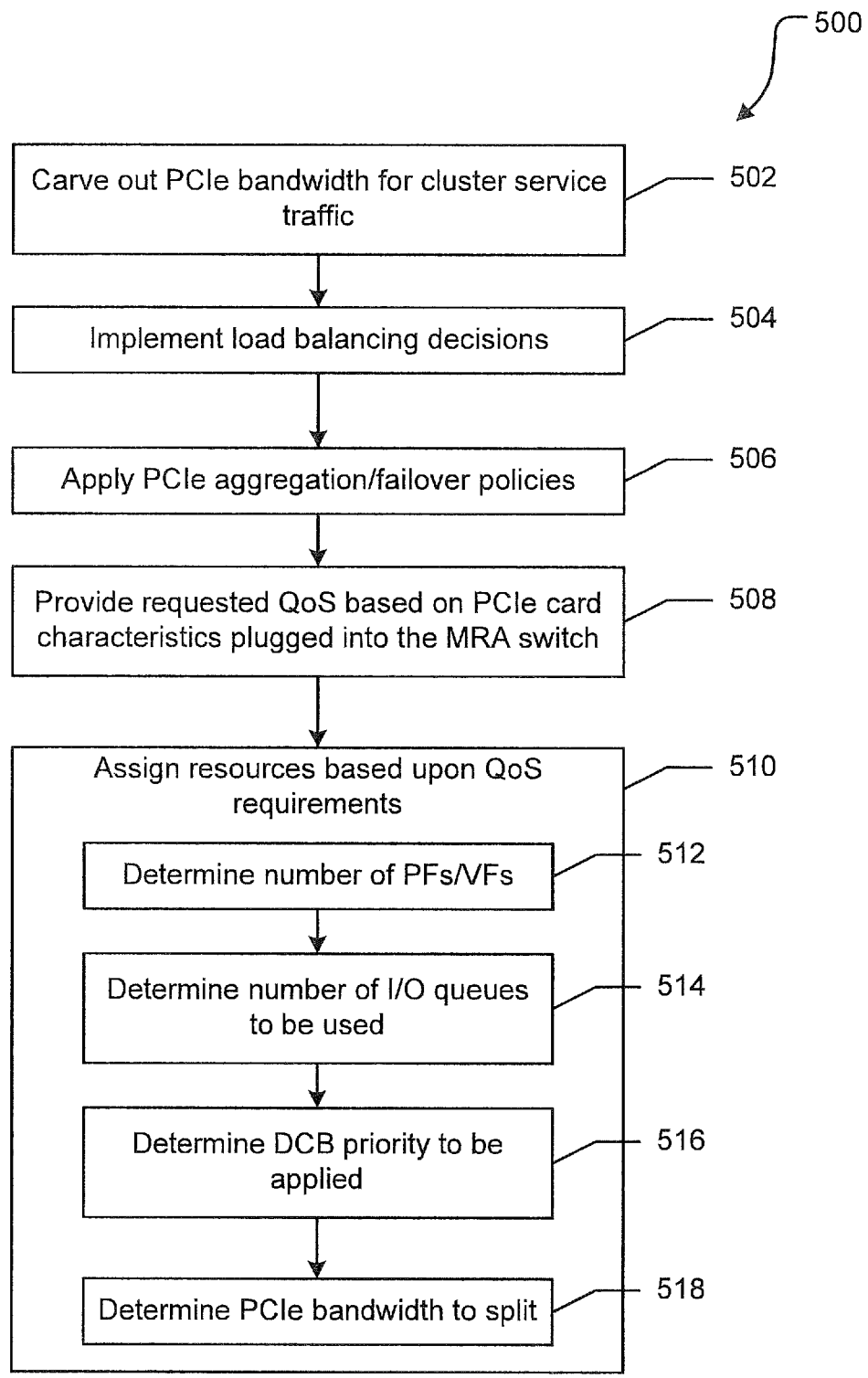
FIG. 5 is a flow diagram illustrating the functions of a cluster manager according to an embodiment of the present disclosure.

FIG. 5 illustrates the functions 500 of a cluster manager, such as cluster manager 114 of FIG. 1. FIG. 5 begins with carving out PCIe bandwidth for cluster service traffic, at block 502. Cluster service traffic is traffic between nodes of a cluster concerning administration of a cluster. The traffic may include traffic to select a cluster manager from the cluster managers of the individual nodes. The carving out may include selecting a number of PCIe lanes from the PCIe links connecting the nodes for use for the cluster service traffic. For example, the cluster service traffic may require a ×1 or an ×2 PCIe link from one node to another. FIG. 5 continues with the cluster manager implementing load balancing decisions, at block 504. These decisions may include an assignment of portions of a capacity of the end devices to the applications running on the nodes of the computer cluster, such as the assignment of half of the capacity of NIC 410 and all of the capacity of NIC 414 to server 404 in FIG. 4. These decisions may also include routing decisions, where the topology of the computer cluster provides multiple paths between an end device and a node. In FIG. 4, for example, traffic from NIC 410 may reach server 404 directly from MRA switch 406, or may proceed from MRA switch 406 to MRA 408 before arriving at server 404.

The cluster manager may apply PCIe aggregation/failover policies at block 506. The aggregation policies determine the assignment of PCIe lanes for the various traffics. For example in FIG. 1, four lanes from PCIe link 148 between node 104 and MRA switch 118 may be allocated to SAN traffic from SAN 134. The failover policies may determine alternate routes or alternate resources in case of failure. Again looking to FIG. 1, a failover policy may specify for node 102 to use SAN 136 if SAN 134 fails or to route traffic through port 112 if port 110 fails.

At block 508, the cluster manager provides requested qualify of service (QoS) based on the characteristics of PCIe cards plugged into the MRA switches. QoS requirement refer to bandwidth and latency requirements of applications, such as multimedia applications. A streaming video may transmit a number of frames of a certain size. In addition, the application may have requirements as to the delay in the frames. Given the requirements, the cluster manager may examine the characteristics of the cluster devices to determine an allocation of resources to satisfy the requirements. The devices may consist of cards of different functionalities that may be plugged into a PCIe slot and operate as a PCIe device, including, for example, Fibre Channel cards, Ethernet cards, and InfiniBand cards. Once a card is plugged into a PCIe slot, the cluster manager can determine its characteristics and make resource allocations accordingly. It may, for example, determine that a card provides 4G Fibre Channel bandwidth, or that it provides 10G Ethernet bandwidth with a particular latency.

At block 510, the cluster manager assigns resources to the nodes based upon the QoS requirements. The assignment of resources includes determining the number of physical functions and virtual functions, at block 512. A Virtual Function (VF) is a function, within an IOV enabled endpoint, that shares one or more physical endpoint resources, such as a link, with other VFs and can, without run-time intervention by a virtual intermediary, such as a hypervisor, communicate with a system image. A VF may directly sink I/O and memory operations from a system image. A VF may also directly source direct memory access (DMA), completion and interrupt operations to a system image.

The cluster manager also determines a number of I/O queues to be used, at block 514. The I/O queues may queue traffic at a switch while the traffic is awaiting routing to a further destination. The queued traffic may include traffic between the endpoints and the switches, traffic between two switches, or traffic between switches and nodes.

At block 516, the cluster manager determines a DCB priority to be applied. The DCB priority is based upon the type of application, and helps to determine the bandwidth and latency specification provided for the application by an Ethernet-enabled device. At block 518, the cluster manager determines the PCIe bandwidth to split. The determination includes a determination of a path or paths from an end device to a node and the number of PCIe lanes in each path.

Some embodiments of FIG. 5 may enable a fabric-independent PCIe cluster manager. Traditionally, cluster managers need to know about the underlying interconnect and the cluster interconnect timeouts of the underlying technology need to be taken into consideration in configuring a cluster. By designing the PCIe fabric to virtualize end devices, such as by assigning VFs to physical endpoints, the cluster manager may become independent of the end devices. The cluster design may then modeled as per the quality of service requested by the cluster service users and may not be dependent on a static underlying fabric.

Figure 6:
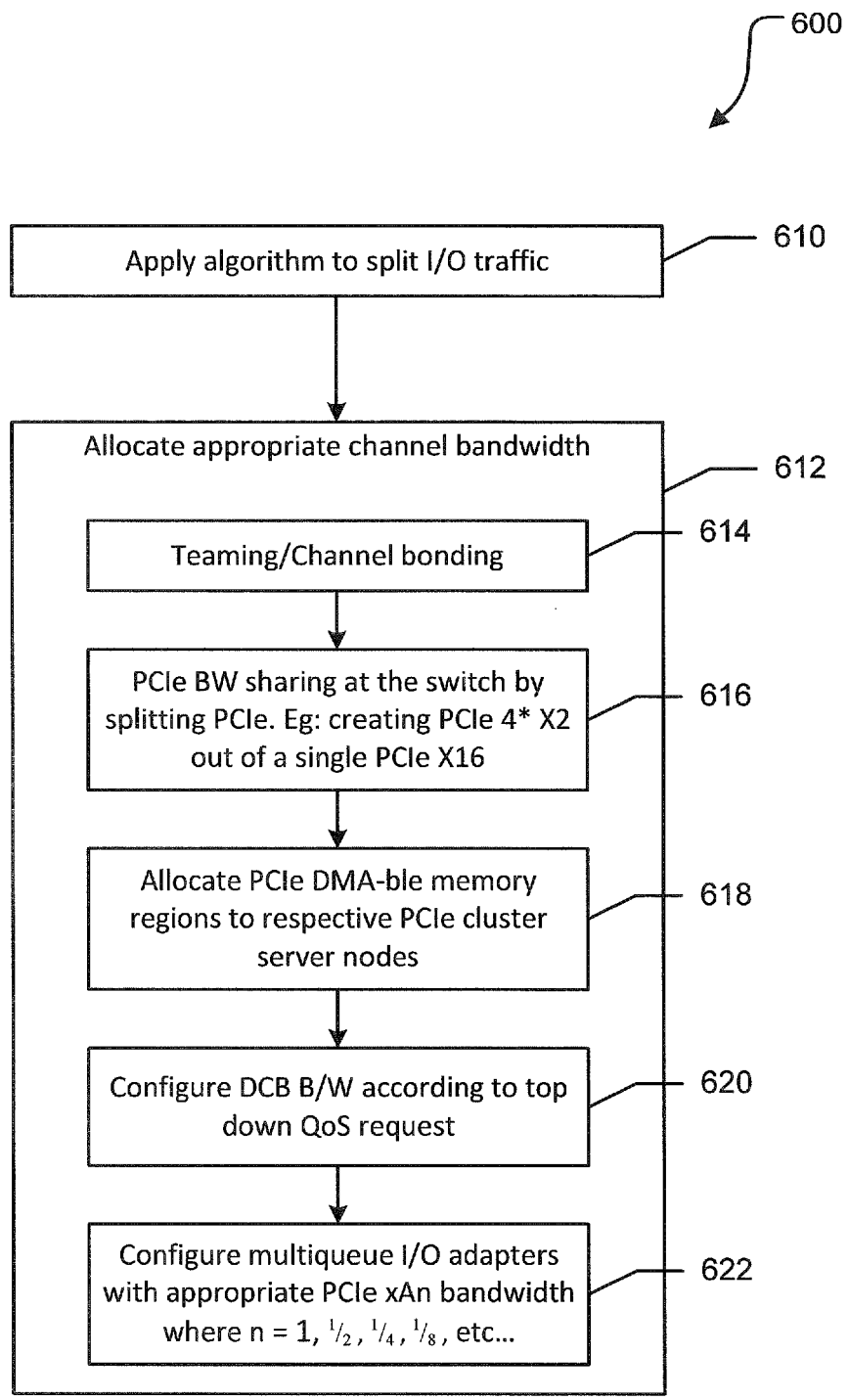
FIG. 6 is a flow diagram illustrating a method of input/output (I/O) slicing according to an embodiment of the present disclosure.

FIG. 6 illustrates a method of I/O slicing. The method begins applying an algorithm to split I/O traffic at block 610. The algorithm may specify a quantity of traffic between an end device, such as SANs 412 and 416 and NICs 410 and 414 of FIG. 4, and a node partition of node, such as servers 402 and 404 of FIG. 4. In the example of FIG. 4, an algorithm specifies that half of the traffic of NIC 416 is to go to server 404 and half the traffic is to go to server 402; and that all traffic of NIC 414 is to go to server 404. As a result, application A of server 404 will be provided an NIC capacity equal to the capacity of NIC 414 and half of the capacity of NIC 410. If NIC 410 and NIC 414 have equal capacity, then application A will be provided a NIC capacity of 1.5 times either NIC.

At block 612, the appropriate channel bandwidth is allocated. The allocation may be performed by a cluster manager, such as cluster manager 114 of FIG. 1. The allocation includes determining a path or paths from end devices to a node or partition of the node, and quantities of traffic over each path. In the case of PCIe links, the allocation also includes determining a number of PCIe lanes on each path, such as a ×1 lane, or an ×8 lane.

The allocation may include teaming or channel bonding, at block 614. These terms describe the process of combining several physical end devices into a single virtual device. Teaming may be used when an allocation differs from the exact capacity of a single physical end device. In that case, several physical devices may be combined into a single virtual device with the combined capacity of the individual devices. Then, capacity is allocated from the virtual devices to the individual nodes or partitions to satisfy their I/O requirements.

Figure 7:
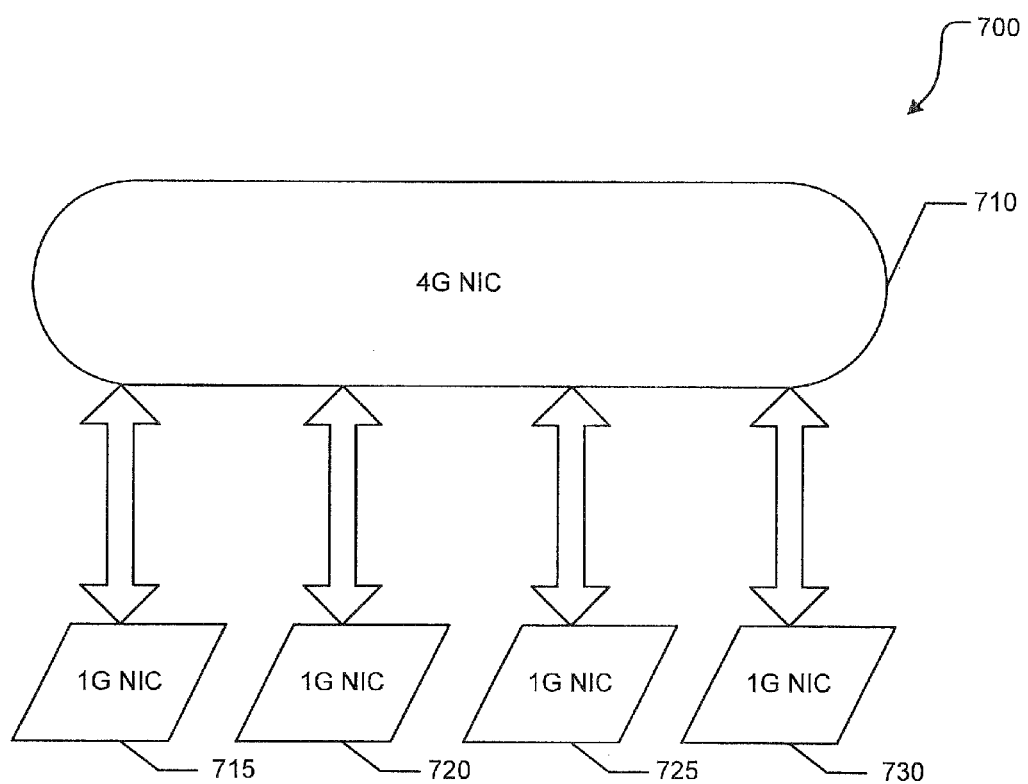
FIG. 7 is a block diagram illustrating the bonding of network resources according to an embodiment of the present disclosure.

FIG. 7 shows an example of bonding 700. FIG. 7 includes virtual NIC 710 with 4G capacity and four 1G physical NICs, NICs 715, 720, 725, and 730. In FIG. 7, NICs 715, 720, 725, and 730 are bonded into NIC 710. The bonding may be performed by a switch or switches, such as the MRA switches 406 and 408 in FIG. 4. In the example of FIG. 7, portions of the capacity of NIC 710 may be assigned to various nodes. Bonding and I/O slicing may avoid the need to add physical resources when an application needs more resources. Instead of physically connecting a new resource to the node running the device, the switches of a cluster may be able to allocate unused capacity from a bonded virtual device.

Returning to FIG. 6, the allocation may include PCIe BW sharing at the switch by splitting a PCIe link or links, at block 616. As an example, a single PCIe X16 link may be subdivided into 4*X2 PCIe links for a particular task or tasks, leaving 8 lanes for other tasks. The allocation may also include allocating PCIe Direct Memory Access (DMA)-ble memory regions to respective PCIe cluster server nodes, at block 618. A PCIe endpoint may be able to read and write data to (DMA)-ble memory regions of a node without the intervention of a processor, a hypervisor, or other partition supervisor. The allocation of DMA-ble regions may involve assigning the regions to the PCIe endpoints.

The allocation may include configuring DCB bandwidth according to top down QoS requests, at block 620. The top down request may include a specification of a priority or priorities for an application in a policy provided to a cluster manager. As part of the provision of resources for implementing the policy, the cluster manager may then determine a DCB priority or priorities for the application. With each DCB priority, the cluster manager may determine an associated bandwidth, since the DCB protocol treats different priorities as separate lanes. DCB-capable switches identify traffic tagged with specific priorities and map them to priority groups. Traffic of the priority groups may be treated to enable it to achieve QoS characteristics such as minimum guaranteed bandwidth, prioritized flow control, and lossless transmission. The cluster manager may utilize the DCB mechanism by tagging the traffic with a specific priority, especially for traffic over interconnects such as Fibre Channel over Ethernet (FCoE), iSCSI, InfiniBand over Ethernet (IBoE), or traffic over Converged Ethernet.

The allocation may include configuring multiqueue I/O adapters with appropriate PCIe xAn bandwidth, at block 622. A multiqueue I/O adapter provides multiple queues for traffic between the I/O adapter and another device, such as a switch. Where there is a PCIe link between the I/O adapter and the other device, the 16 lanes of link can be partitioned among the queues. For example, if there are 3 queues and a 16-lane link, two of the queues may each receive 4 and the other may receive 8 lanes.

Figure 8:
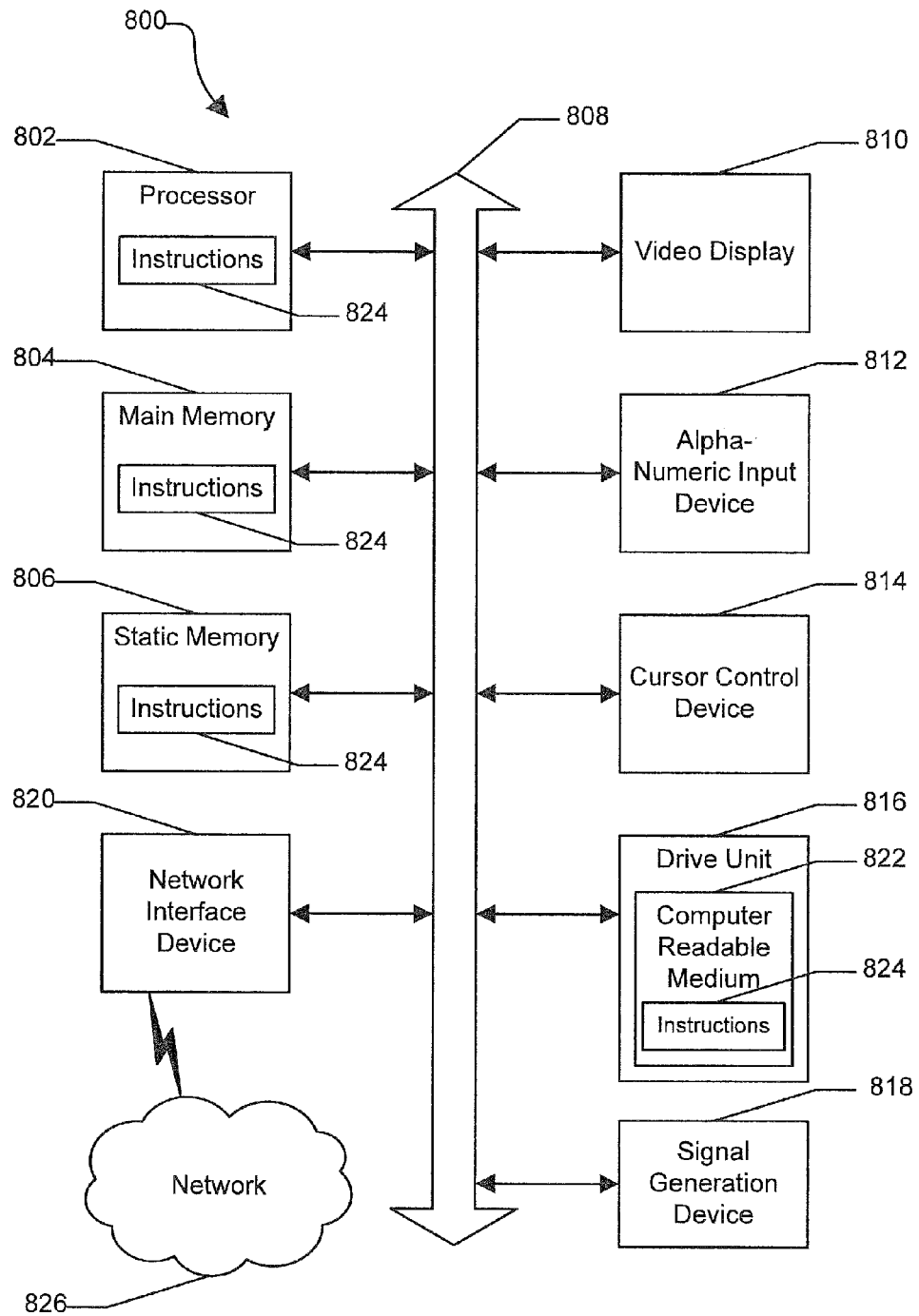
FIG. 8 is a block diagram illustrating an information handling system according to an embodiment of the present disclosure.

FIG. 8 is a block diagram illustrating an embodiment of an information handling system 800, including a processor 810, a chipset 820, a memory 830, a graphics interface 840, an input/output (I/O) interface 850, a disk controller 860, a network interface 870, and a disk emulator 880. In a particular embodiment, information handling system 800 is used to carry out one or more of the methods described herein. In another embodiment, one or more of the systems described herein are implemented in the form of information handling system 800.

Chipset 820 is connected to and supports processor 810, allowing the processor to execute machine-executable code. In a particular embodiment, information handling system 800 includes one or more additional processors, and chipset 820 supports the multiple processors, allowing for simultaneous processing by each of the processors and permitting the exchange of information among the processors and the other elements of the information handling system. Chipset 820 can be connected to processor 810 via a unique channel, or via a bus that shares information among the processor, the chipset, and other elements of information handling system 800.

Memory 830 is connected to chipset 820. Memory 830 and chipset 820 can be connected via a unique channel, or via a bus that shares information among the chipset, the memory, and other elements of information handling system 800. In another embodiment (not illustrated), processor 810 is connected to memory 830 via a unique channel. In another embodiment (not illustrated), information handling system 800 includes separate memory dedicated to each of the one or more additional processors. A non-limiting example of memory 830 includes static random access memory (SRAM), dynamic random access memory (DRAM), non-volatile random access memory (NVRAM), read only memory (ROM), flash memory, another type of memory, or any combination thereof.

Graphics interface 840 is connected to chipset 820. Graphics interface 840 and chipset 820 can be connected via a unique channel, or via a bus that shares information among the chipset, the graphics interface, and other elements of information handling system 800. Graphics interface 840 is connected to a video display 842. Other graphics interfaces can also be used in addition to graphics interface 840 as needed or desired. Video display 842 includes one or more types of video displays, such as a flat panel display, another type of display device, or any combination thereof.

I/O interface 850 is connected to chipset 820. I/O interface 850 and chipset 820 can be connected via a unique channel, or via a bus that shares information among the chipset, the I/O interface, and other elements of information handling system 800. Other I/O interfaces (not illustrated) can also be used in addition to I/O interface 850 as needed or desired. I/O interface 850 is connected via an I/O interface 852 to one or more add-on resources 854. Add-on resource 854 is connected to a storage system 890, and can also include another data storage system, a graphics interface, a network interface card (NIC), a sound/video processing card, another suitable add-on resource or any combination thereof. I/O interface 850 is also connected via I/O interface 852 to one or more platform fuses 856 and to a security resource 858. Platform fuses 856 function to set or modify the functionality of information handling system 800 in hardware. Security resource 858 provides a secure cryptographic functionality and includes secure storage of cryptographic keys. A non-limiting example of security resource 858 includes a Unified Security Hub (USH), a Trusted Platform Module (TPM), a General Purpose Encryption (GPE) engine, another security resource, or a combination thereof.

Disk controller 860 is connected to chipset 820. Disk controller 860 and chipset 820 can be connected via a unique channel, or via a bus that shares information among the chipset, the disk controller, and other elements of information handling system 800. Other disk controllers (not illustrated) can also be used in addition to disk controller 860 as needed or desired. Disk controller 860 includes a disk interface 862. Disk controller 860 is connected to one or more disk drives via disk interface 862. Such disk drives include a hard disk drive (HDD) 864, and an optical disk drive (ODD) 866, and can include one or more disk drive as needed or desired. ODD 866 can include a Read/Write Compact Disk (R/W-CD), a Read/Write Digital Video Disk (R/W-DVD), a Read/Write mini Digital Video Disk (R/W mini-DVD), another type of optical disk drive, or any combination thereof. Additionally, disk controller 860 is connected to disk emulator 880. Disk emulator 880 permits a solid-state drive 884 to be coupled to information handling system 800 via an external interface 882. External interface 882 can include industry standard busses such as USB or IEEE 1394 (Firewire) or proprietary busses, or any combination thereof. Alternatively, solid-state drive 884 can be disposed within information handling system 800.

Network interface device 870 is connected to I/O interface 850. Network interface 870 and I/O interface 850 can be coupled via a unique channel, or via a bus that shares information among the I/O interface, the network interface, and other elements of information handling system 800. Other network interfaces (not illustrated) can also be used in addition to network interface 870 as needed or desired. Network interface 870 can be a network interface card (NIC) disposed within information handling system 800, on a main circuit board such as a baseboard, a motherboard, or any combination thereof, integrated onto another component such as chipset 820, in another suitable location, or any combination thereof. Network interface 870 includes a network channel 872 that provide interfaces between information handling system 800 and other devices (not illustrated) that are external to information handling system 800. Network interface 870 can also include additional network channels (not illustrated).

Information handling system 800 includes one or more application programs 832, and Basic Input/Output System and Firmware (BIOS/FW) code 834. BIOS/FW code 834 functions to initialize information handling system 800 on power up, to launch an operating system, and to manage input and output interactions between the operating system and the other elements of information handling system 800. In a particular embodiment, application programs 832 and BIOS/FW code 834 reside in memory 830, and include machine-executable code that is executed by processor 810 to perform various functions of information handling system 800. In another embodiment (not illustrated), application programs and BIOS/FW code reside in another storage medium of information handling system 800. For example, application programs and BIOS/FW code can reside in HDD 864, in a ROM (not illustrated) associated with information handling system 800, in an option-ROM (not illustrated) associated with various devices of information handling system 800, in storage system 890, in a storage system (not illustrated) associated with network channel 872, in another storage medium of information handling system 800, or a combination thereof. Application programs 832 and BIOS/FW code 834 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A cluster manager of a node of a computer cluster, the computer cluster having endpoints connected to the computer cluster by a plurality of interconnects, the cluster manager comprising:

a communication module to receive specifications of resource requirements of applications to run on the computer cluster, the resource requirements including storage and network connectivity requirements; and a configuration module to determine resources available from the endpoints of the computer cluster, to determine allocations of resources from the endpoints to satisfy the resource requirements of the applications, and to configure the computer cluster to provide resources for the applications in accordance with the allocations, the configuring including configuring the interconnects to provide the allocated resources to the applications, wherein:
the specifications of resource requirements includes a specification of Quality of Service (QoS) requirements, including priority class and a maximum latency requirements; and
the configuration module is to determine an allocation of resources to satisfy the QoS requirements, including the priority class and maximum latency requirements, the determining comprising:
selecting classes of traffic of the applications; and
mapping the classes of traffic to Data Center Bridging (DCB) priority classes based upon priorities of the classes of traffic.

2. The cluster manager of claim 1, wherein:
the computer cluster comprises a Peripheral Component Interconnect express (PCIe) fabric; and
the configuration module is to allocate PCIe lanes from the PCIe fabric for interprocess communications and cluster service traffic.

3. The cluster manager of claim 2, wherein the configuration module is to allocate resources of virtual functions (VF) from the endpoints to the applications.

4. The cluster manager of claim 1, wherein the endpoints communicate with the computer cluster via at least one of the following communications protocols:
InfiniBand;
Fibre Channel;
Internet Small Computer System Interface (iSCSI); and
Ethernet.

5. The cluster manager of claim 1, wherein:
the computer cluster comprises a plurality of nodes;
the determination of allocations of resources is to include a first allocation of resources for a first application to run on a first node of the nodes and a second allocation of resources for a second application to run on a second node of the nodes; and
the configuration is to include setting I/O configuration parameters for the second node by the configuration module.

6. A method comprising:
receiving at a cluster manager of a node of a computer cluster a specification of resource requirements of a first application to run on the computer cluster, the resource requirements including storage and network connectivity bandwidth requirements;
determining resources available from endpoints of the computer cluster, wherein the endpoints are connected to the computer cluster by a plurality of interconnects;
determining of a first allocation of resources from the endpoints to satisfy the resource requirements of the first application;
determining by the cluster manager a second allocation of resources from the endpoints for a second application, the second application to run on another node of the computer cluster;
configuring the computer cluster to provide resources for the first application in accordance with the allocation, including configuring the interconnects to provide the allocated resources to the application; and
setting I/O configuration parameters for the other node of the computer cluster by the cluster manager.

7. The method of claim 6, wherein:
the specification of resource requirements includes a specification of Quality of Service (QoS) requirements; and
the determining the allocation of resources comprises determining an allocation of resources to satisfy the QoS requirements.

8. The method of claim 7, wherein:
the QoS requirements comprise priority class and maximum latency requirements, and
the determining the allocation of resources comprises determining the allocation of resources to satisfy the priority class and maximum latency requirements.

9. The method of claim 8, wherein the determining the allocation of resources comprises:
selecting classes of traffic of the application; and
mapping the classes of traffic to Data Center Bridging (DCB) priority classes based upon priorities of the classes of traffic.

10. The method of claim 7, wherein the QoS requirements include Ethernet DCB QoS guarantees and InfiniBand latency limits.

11. The method of claim 6, wherein:
the computer cluster comprises a Peripheral Component Interconnect express (PCIe) fabric; and
the configuring comprises allocating PCIe lanes from the PCIe fabric for interprocess communications and cluster service traffic.

12. The method of claim 6, wherein the configuring comprises allocating resources from virtual functions (VF) of the endpoints to the application.

13. The method of claim 6, wherein the configuring comprises configuring multiqueue input/output (I/O) adapters with PCIe bandwidth allocated for the application.

14. The method of claim 6, wherein:
the computer cluster comprises a multi-root I/O virtualization (MR-IOV) PCIe fabric;
the endpoints comprise PCIe devices connected to multi-root aware (MRA) switches of the PCIe fabric; and
the determining resources available comprises determining the characteristics of the PCIe devices based upon their connections to the MRA switches.

15. The method of claim 14, wherein the configuring comprises configuring PCIe MR-IOV topologies of the computer cluster.

16. The method of claim 6, wherein the endpoints communicate with the computer cluster via at least one of the following communications protocols:
InfiniBand;
Fibre Channel;
Internet Small Computer System Interface (iSCSI); and
Ethernet.

17. The method of claim 6, wherein the configuring comprises allocating a portion of the capacity of an endpoint to the application and allocating another portion of the capacity of the endpoint to another application running on another node of the computer cluster.

18. A method comprising:
determining by a cluster manager of a node of a computer cluster resources available from endpoints of the computer cluster, wherein:
the computer cluster comprises a plurality of nodes connected by a fabric; and
the endpoints are connected to the computer cluster by a plurality of interconnects, wherein the endpoints communicate with the computer cluster via at least one of the following communications protocols:

InfiniBand;
Fibre Channel;
Internet Small Computer System Interface (iSCSI); and
Ethernet;

determining an allocation of resources from the endpoints for running applications on the nodes of the computer cluster; and configuring the computer cluster to provide resources for the applications in accordance with the allocation, the configuring including:

configuring the interconnects to provide the allocated resources to the applications; and setting input/output (I/O) configuration parameters for another node of the computer cluster.

19. The method of claim 18, wherein the determining the allocation of resources comprises determining the allocation of resources to satisfy Quality of Service (QoS) requirements on the applications, including priority class and maximum latency requirements, the determining comprising:

selecting classes of traffic of the applications; and mapping the classes of traffic to Data Center Bridging (DCB) priority classes based upon priorities of the classes of traffic.

20. The method of claim 18, wherein:

the computer cluster comprises a multi-root IO virtualization (MR-IOV) PCIe fabric;

the endpoints comprise PCIe devices connected to multi-root aware (MRA) switches of the PCIe fabric;

the determining the resources available comprises determining the characteristics of the PCIe devices based upon their connections to the MRA switches; and the configuring comprises:

configuring PCIe express MR-IOV topologies of the computer cluster;

allocating PCIe lanes from the MR-IOV PCIe fabric for interprocess communications and cluster service traffic; and allocating resources of virtual functions (VF) of the endpoints to the applications.

* * * * *